(12) United States Patent
Bartl

(10) Patent No.: US 9,873,319 B2
(45) Date of Patent: Jan. 23, 2018

(54) DISPLACEABLE COVERING FOR A MOTOR VEHICLE

(75) Inventor: Juergen Bartl, Remshalden-Grunbach (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/346,154

(22) PCT Filed: Aug. 30, 2012

(86) PCT No.: PCT/EP2012/003635
§ 371 (c)(1),
(2), (4) Date: Mar. 20, 2014

(87) PCT Pub. No.: WO2013/041181
PCT Pub. Date: Mar. 28, 2013

(65) Prior Publication Data
US 2014/0216835 A1    Aug. 7, 2014

(30) Foreign Application Priority Data

Sep. 21, 2011   (DE) .................. 10 2011 113 907

(51) Int. Cl.
*B60K 11/00*   (2006.01)
*B60K 11/08*   (2006.01)
(Continued)

(52) U.S. Cl.
CPC ........ *B60K 11/085* (2013.01); *B60R 13/0838* (2013.01); *B60R 13/0861* (2013.01);
(Continued)

(58) Field of Classification Search
CPC ....... B60K 11/085; B60K 11/04; B60K 11/02; B60K 11/06; B60R 13/0838; B60R 13/0861; B60Y 2200/14; B62D 33/06
(Continued)

(56) References Cited

U.S. PATENT DOCUMENTS 3,636,684 A * 1/1972 Vogelaar ................ A01D 41/12
55/332
3,786,891 A * 1/1974 Vogelaar ................ A01D 41/12
180/68.4
(Continued)

FOREIGN PATENT DOCUMENTS

DE   24 22 390 A1   11/1975
DE   31 50 152 A1   6/1983
(Continued)

OTHER PUBLICATIONS

International Search Report (PCT/ISA/210) with English translation thereof dated May 23, 2013 {Eight (8) pages}.
(Continued)

*Primary Examiner* — James M Dolak
(74) *Attorney, Agent, or Firm* — Crowell & Moring LLP

(57) ABSTRACT

A covering for a truck covers a bottom of the engine compartment, and includes a covering element displaceable from a covering position into at least one further position. A clear opening in relation to a vertical direction of the vehicle is exposed in the at least one further position of the covering element. An additional covering for a driver's cab of the truck can cover the rear of the engine compartment. The additional covering has at least one covering element that is displaceable from a covering position into at least one further position.

6 Claims, 1 Drawing Sheet

Figure 1:
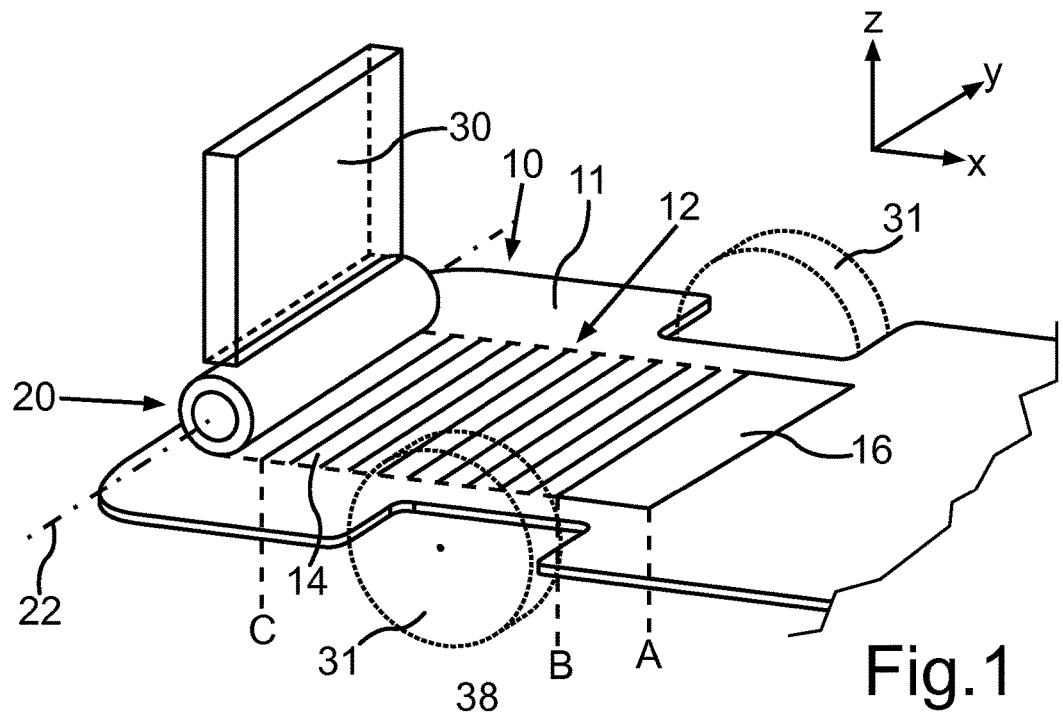

(51) Int. Cl.
   *B60R 13/08* (2006.01)
   *B60K 11/02* (2006.01)
   *B60K 11/06* (2006.01)
   *B60K 11/04* (2006.01)

(52) U.S. Cl.
   CPC .............. *B60K 11/02* (2013.01); *B60K 11/04* (2013.01); *B60K 11/06* (2013.01); *B60Y 2200/14* (2013.01); *Y02T 10/88* (2013.01)

(58) Field of Classification Search
   USPC .............. 180/68.1, 69.2, 69.21, 69.24, 89.17
   See application file for complete search history.

(56) References Cited

U.S. PATENT DOCUMENTS

| | | | | |
|---|---|---|---|---|
| 3,918,547 | A * | 11/1975 | Kramer et al. | 180/68.1 |
| 3,929,202 | A * | 12/1975 | Hobbensiefken | 180/68.4 |
| 4,141,427 | A * | 2/1979 | Kirchweger | B60R 13/0838 180/69.22 |
| 4,221,274 | A * | 9/1980 | Martin, Jr. | B62D 25/10 180/69.2 |
| 4,476,820 | A * | 10/1984 | Nixon | B60K 11/00 123/195 C |
| 4,590,889 | A * | 5/1986 | Hiereth | B60K 11/08 123/41.05 |
| 4,770,457 | A * | 9/1988 | Tomforde | 296/180.5 |
| 4,924,826 | A * | 5/1990 | Vinson | 123/195 C |
| 6,357,820 | B1 * | 3/2002 | Nagatsuka | E02F 3/3414 180/89.14 |
| 6,588,380 | B2 * | 7/2003 | Ries-Mueller | 123/41.05 |
| 6,622,807 | B2 * | 9/2003 | Preiss | B62D 35/02 165/44 |
| 6,854,544 | B2 * | 2/2005 | Vide | B60K 11/085 180/68.1 |
| 7,055,880 | B2 * | 6/2006 | Archer | A62C 27/00 296/37.1 |
| 7,150,494 | B2 * | 12/2006 | Bangle | B32B 5/24 296/180.5 |
| 7,261,173 | B2 * | 8/2007 | Kurtz, Jr. | E02F 9/0891 180/69.2 |
| 7,401,672 | B2 * | 7/2008 | Kurtz, Jr. | B60K 11/04 180/165 |
| 7,673,931 | B2 * | 3/2010 | Takano | B62D 33/0625 180/89.14 |
| 8,892,314 | B2 * | 11/2014 | Charnesky | B60K 11/085 180/68.1 |
| 9,120,442 | B2 * | 9/2015 | Han | B60R 13/0876 |
| 9,126,643 | B2 * | 9/2015 | Nagami | E02F 9/163 |
| 9,216,644 | B2 * | 12/2015 | Cardile | B60K 11/085 |
| 9,297,144 | B2 * | 3/2016 | Hanada | E02F 9/0866 |
| 9,388,730 | B2 * | 7/2016 | Tsutsumi | B60K 11/04 |
| 9,440,555 | B2 * | 9/2016 | Garfinkel | B60L 11/1874 |
| 9,447,719 | B2 * | 9/2016 | Kiener | F01P 7/02 |
| 9,533,564 | B2 * | 1/2017 | Asano | B60K 11/08 |
| 9,533,565 | B2 * | 1/2017 | Elliott | B60K 11/085 |
| 9,573,458 | B2 * | 2/2017 | Manhire | B60K 11/085 |
| 9,579,968 | B2 * | 2/2017 | Rizzon | B60K 11/08 |
| 9,586,625 | B2 * | 3/2017 | Crane | B60K 11/085 |

FOREIGN PATENT DOCUMENTS

| | | |
|---|---|---|
| DE | 100 50 219 A1 | 4/2002 |
| DE | 10 2006 001 797 A1 | 7/2007 |
| DE | 10 2009 025 206 A1 | 12/2010 |
| EP | 0 031 131 A1 | 7/1981 |
| EP | 1 473 449 A1 | 11/2004 |
| JP | 7-64564 A | 3/1995 |
| JP | 2002-120571 A | 4/2002 |

OTHER PUBLICATIONS

German-language Written Opinion (PCT/ISA/237) dated May 23, 2013 {Six (6) pages}.
Partial English-language translation of Japanese Office Action dated Jan. 13, 2015 (One (1) page).

* cited by examiner

DISPLACEABLE COVERING FOR A MOTOR VEHICLE

BACKGROUND AND SUMMARY OF THE INVENTION

Exemplary embodiments of the invention relate to a covering for a motor vehicle and a covering for a driver's cab of a truck.

Coverings of this type have been known for quite some time. Thus, German patent document DE 100 50 219 A1 discloses a device for air cooling of units subjected to high temperatures, in particular an internal combustion engine and a transmission. The device includes a displaceable air inlet and a lowerable capsule, the capsule corresponding to a covering for a motor vehicle. For improved cooling of the units subjected to high temperatures, the capsule may be lowered in its rear area so that an air inlet is exposed and an air flow to the outside is generated.

However, lowering the capsule in its rear area produces only a ramp-like opening that is open toward the rear, so that in the vertical direction of the vehicle the lowered rear part of the capsule represents a hindrance to air flow as well as to heat radiation of the units subjected to high temperatures. This has an adverse effect on the heat dissipation of the units subjected to high temperatures.

Exemplary embodiments of the present invention are, therefore, directed to a covering by means of which improved heat dissipation of units subjected to high temperatures is made possible.

A covering according to the invention for a motor vehicle, in particular a truck, by means of which an engine compartment of the motor vehicle is covered toward the bottom, at least in parts, and which has at least one covering element that is displaceable from a covering position into at least one further position, includes at least one further position of the displacement element, a clear opening in relation to a vertical direction of the vehicle is exposed. Thus, while in the arrangement disclosed by German patent document DE 100 50 219 A1 the covering element still completely provides a covering toward the bottom in the vertical direction of the vehicle after the displacement from the covering position, in contrast, according to the invention it is provided that after the covering element is displaced toward the bottom in the vertical direction of the vehicle, a free opening is created that is not covered by the covering element.

Improved heat dissipation from the engine is thus provided, since the heated cool air flow as well as the heat radiation emitted from the engine may be downwardly discharged without hindrance, so that, depending on the position of the displaceable covering element, an effective acoustic encapsulation of the engine with an aerodynamically favorable covering of the motor vehicle underbody, or optionally an effective heat dissipation from the engine, is provided.

In addition, a covering for a driver's cab of a truck is provided, by means of which an engine compartment of the motor vehicle is covered toward the rear, at least in parts, in the area of a rear wall of the driver's cab, and which has at least one covering element that is displaceable from a covering position into at least one further position. For trucks, in addition to possibly discharging engine heat through openings in the underbody covering, the option is thus provided for discharging the engine heat in the form of heated cooling air at the rear side of the driver's cab, as well as heat radiation. Due to the circulation conditions from the truck, a negative pressure that additionally assists in discharging the heated cooling usually prevails at the rear wall of the driver's cab. A further improvement in the heat dissipation from the engine of a motor vehicle, in particular a truck, is thus provided which, when needed, may be achieved by displacing the at least one covering element from the covering position into a further position. Furthermore, due to the displaceability of the at least one covering element, acoustic encapsulation of the engine may be made possible.

In one advantageous embodiment of the invention, the covering element includes a roller blind, in particular a roller shutter. As a result, the covering element has a flexible structure and may be rolled up in a space-saving manner when the covering element completely or partially exposes the clear opening.

Another advantageous embodiment of the invention provides that the covering element includes at least one rotatable slat element. The clear opening may be easily exposed with the aid of the rotatable slat element or multiple rotatable slat elements. When multiple rotatable slat elements are used, it is also possible to partially expose the clear opening without the need for translationally moving the entire covering element. In addition, translational guiding for the covering element in the longitudinal direction of the vehicle may thus be dispensed with, or a combined displacement of the covering element, by the pivotable slat elements as well as by the connecting element which is translationally movable in the direction of the vehicle longitudinal axis, is achievable.

In another advantageous embodiment, components of the covering are an integral part of noise encapsulation or aerodynamic devices that are present in the motor vehicle. It is thus possible to accommodate the components of the covering in a space-saving manner in modules that are already present in the motor vehicle, for example when the displacement element of the covering exposes a clear opening.

Another advantageous embodiment of the invention provides that the at least one covering element is displaceable as a function of operating parameters that are detectable by means of a sensor system. Thermal and aerodynamic operating conditions as well as the speed of the motor vehicle are detected with the aid of the sensor system in order to control the position of the covering element based on these parameters. For example, during freeway driving under part load, the most optimal aerodynamics possible are particularly desirable, whereas during city driving, at lower speeds, and likewise part load, the lowest possible noise emissions are the primary focus. It is thus ensured that, depending on the driving conditions, the best possible compromise is automatically made between the aerodynamic, acoustic, and thermodynamic requirements during operation of the motor vehicle, in that the displaceable covering is automatically controlled via the operating parameters which are detectable by means of the sensor system.

In addition, it is advantageous when the displaceable covering in the covering position effectively reduces or damps undesired noise emissions such as engine noise. Lastly, in another advantageous embodiment the invention thus provides that the material of the at least one covering element is acoustically absorbent.

The provided approach is also positioned upstream from the radiator inlet surface.

The control system may additionally process parameters from a GPS and TMC signals, and thus predictively recognize driving situations (uphill travel and traffic congestion) and optimize the aerodynamics, i.e., the air flow for cooling the units and the cooling system. The topography of the route ahead of the vehicle may be taken into account.

In the closed state, a roller shutter situated at the front side in front of the radiator has a positive influence on aerodynamics and exterior noise. The system may be opened as needed, so that the cooling system is supplied with cooling air only when it is needed. During long-distance travel, in particular on long expressway trips, operation in the open state is generally not necessary. Compete opening of the radiator is necessary only in a few driving situations.

Further advantages, features, and particulars of the invention result from the following description of a preferred exemplary embodiment and with reference to the drawings. The features and feature combinations mentioned above in the description as well as the features and feature combinations mentioned below in the description of the figures and/or only shown in the figures may be used not only in the particularly stated combination, but also in other combinations or alone without departing from the scope of the invention.

BRIEF DESCRIPTION OF THE DRAWING FIGURES

Figure 2:
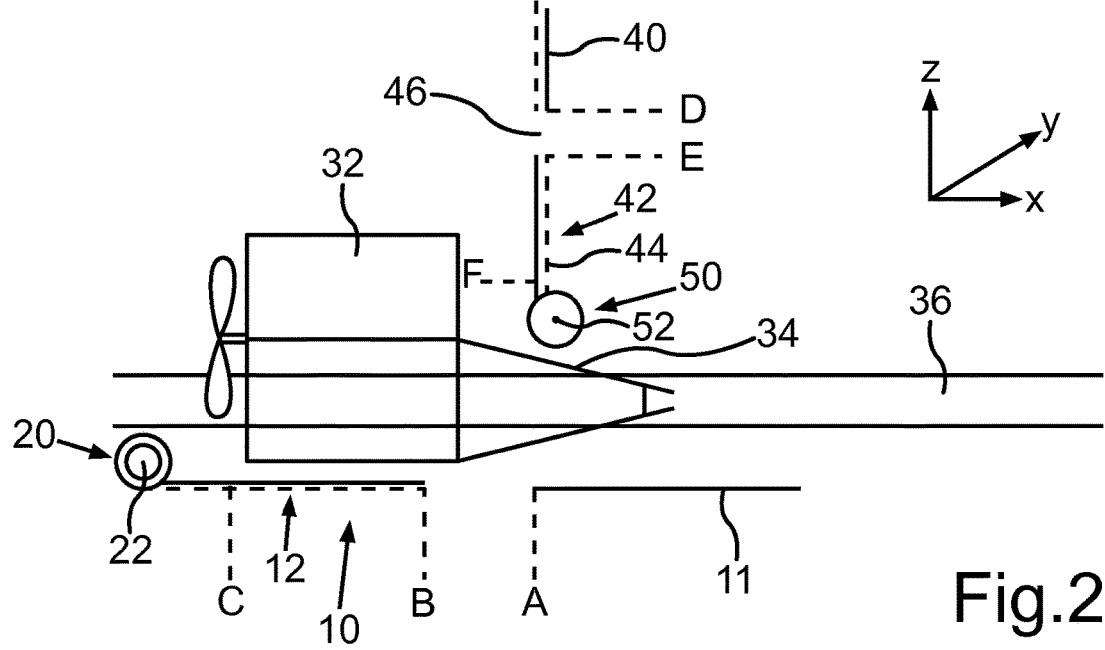

The drawings show the following:

FIG. 1 shows a schematic perspective view of an underbody covering of a truck, having a displaceable covering element in the form of a roller shutter, which has been moved from a covering position into a further position, shown here, which exposes a clear opening in relation to a vertical vehicle direction of the truck; and FIG. 2 shows a side sectional illustration of the underbody covering of the truck shown in FIG. 1 along a center longitudinal section plane, a covering also being illustrated by means of which an engine compartment of the motor vehicle is covered toward the rear, at least in parts, in the area of a rear wall of a driver's cab, and which, in the present case as a covering element, is displaceable from a covering position into at least one further position.

DETAILED DESCRIPTION

FIG. 1 shows a covering 10 mounted to the underside of a truck and which is usually referred to as an underbody covering that covers an engine compartment of the vehicle toward the bottom, at least in parts, and a stationary covering part 11, as well as a movable covering element 12, which in the present case is designed as a roller shutter 20.

The covering element 12, which in the present case is designed as a roller shutter or as a type of roller blind or similar windable or foldable element, has a plurality of slat elements 14 which may be made, at least in part, of an acoustically absorbent material such as a plastic. The covering element 12 or the roller shutter is mounted on the stationary covering part 11, which in the present case is designed as a rectangular frame element, and guided in a translationally movable manner in the direction of the vehicle longitudinal axis (x axis), and is illustrated in a partially open position B, in the present case the covering element 12 being centrally situated between the schematically illustrated front wheels 31 of the truck in the direction of the vehicle transverse axis (y axis). Also illustrated is a radiator 30 situated at the front side of the truck, beneath which the covering element 12, which is partially wound about a roller shutter axis 22, is situated.

For the most effective possible reduction of noise emissions from the engine, for example, the covering element 12 may be moved into a covering position A so that in the area of the covering 10 the engine compartment of the truck is sealed off toward the underside, thus significantly reducing the noise emissions from the engine. The covering 10, which in the covering position A is tightly fitted toward the bottom in the direction of the vertical axis of the vehicle (z axis), likewise has a positive effect on the aerodynamic properties of the truck, and allows a reduction in the fuel consumption and the associated pollutant emissions such as $CO_2$.

However, if the most effective possible effective heat dissipation from the engine compartment of the truck is the primary focus, the covering element 12 may be moved in the direction of the vehicle longitudinal axis (x axis) until reaching a completely open position C, so that the majority of the covering 10 has a clear opening 16 beneath the engine compartment of the truck, and heated cooling air as well as heat radiation emitted from units subjected to high temperatures in the engine compartment may be effectively discharged downwardly from the engine compartment in the direction of the vertical axis of the vehicle (z axis). Upon moving from the covering position A to the completely open position C beneath the radiator 30, the covering element 12 may be rolled up in the form of a roller shutter 20 about the roller shutter axis 22 in a space-saving manner.

Alternatively, an embodiment is conceivable in which the slat elements 14 of the covering element 12 are pivotable about their respective axis extending in the direction of the vehicle transverse axis (y axis), so that individual or all slat elements 14 may be pivoted from a position sealing off the underbody of the truck into a position at the underbody of the truck downwardly exposing in each case a clear opening in the direction of the vertical axis of the vehicle (z axis). In addition, the pivotable slat elements 14 of the covering element 12 may likewise be translationally guided on the stationary covering part 11 within the covering 10 in the direction of the vehicle longitudinal axis (x axis), so that sealing off or exposing the covering in the area beneath the engine compartment of the truck may take place by pivoting the individual slat elements 14 as well as by translationally moving the covering element 12 in combination with rolling or unrolling the covering element 12 about the roller shutter axis 22.

FIG. 2 shows the truck from FIG. 1 along a center longitudinal section plane in a side sectional illustration. It is clearly apparent that the covering 10 shown in FIG. 1, which includes the covering part 11 and the covering element 12 and which is designed to be movable so that it can be wound and unwound in the form of a roller shutter 20 about the roller shutter axis 22 from a covering position A via the partially open position B to the completely open position C, is likewise shown in FIG. 2. Therefore, these elements are denoted by the same reference numerals as in FIG. 1.

An engine 32 which is supported on a frame side member 36 of the truck on an engine mounting, not illustrated in greater detail, and a schematically illustrated transmission 34 are apparent in FIG. 2, the covering 10, which includes the covering part 11 and the covering element 12, is situated beneath the engine 32 and the transmission 34 in the direction of the vertical axis of the vehicle (z axis). FIG. 2 likewise illustrates the covering element 12 in a partially open position B, the covering element 12 being partially rolled up about the roller shutter axis 22 in the form of a roller shutter 20.

Also apparent, in addition to the covering element 12 situated at the underside of the truck, is a further second covering element 42 in the area of the rear wall 40 of the driver's cab 38 of the truck, by means of which the engine compartment of the truck is covered toward the rear, at least in parts, in the area of a rear wall 40 of a driver's cab 38. The second covering element 42, which includes individual slat elements 44, is mounted within the rear wall 40 of the driver's cab 38 so as to be translationally movable in the direction of the vertical axis of the vehicle (z axis), and is illustrated in a partially open position E, so that in the direction of the vehicle longitudinal axis (x axis) a clear opening 46 is exposed in the area of the rear wall by the second covering element 42, and the covering element 42 is partially wound in the form of a roller shutter 50 onto a roller shutter axis 52 situated in the lower area of the rear wall 40.

The second covering element 42, similarly to the first covering element 12, is movable as a function of the driving conditions from an aerodynamically favorable covering position D that damps the engine noise, via a partially open position E, into a completely open position F that provides optimal dissipation of the engine heat, a negative pressure which additionally assists with the heat dissipation prevailing in the partially or completely open position E or F, respectively, due to the circulation conditions at the rear wall 40 of the driver's cab 38 which are usually present during the driving operation. Upon moving from the covering position D into the completely open position F, the second covering element 42 may be rolled up, likewise in the form of a second roller shutter 50, about the roller shutter axis 52 in a space-saving manner.

Alternatively, an embodiment is conceivable in which the slat elements 44 of the covering element 42 are mounted so as to be pivotable about their respective axis extending in the direction of the vehicle transverse axis (y axis), so that individual or all slat elements 44 may be pivoted from a position sealing off the rear wall 40 in the area of the engine compartment of the truck into a position at the rear wall 40 of the truck downwardly exposing in each case a clear opening in the direction of the vehicle longitudinal axis (x axis). In addition, the pivotable slat elements 44 of the covering element 42 may likewise be translationally guided on the rear wall 40 in the direction of the vertical axis of the vehicle (z axis) within the rear wall 40, so that sealing off or exposing the covering in the area beneath the engine compartment of the truck may take place by pivoting the individual slat elements 44 as well as by translationally moving the covering element 12 in combination with rolling or unrolling the covering element 42 about the roller shutter axis 52.

Depending on the driving conditions, the first covering element 12 and the second covering element 42 may each be individually or both closed or partially or completely open, on the one hand to allow the best possible acoustic encapsulation of noise emissions emanating from the engine compartment, or on the other hand to achieve the best possible heat dissipation of heated units such as the engine. Particularly good heat dissipation may be achieved when both covering elements 12, 42 are open, since on the one hand two clear openings for dissipating heat are provided, and on the other hand a type of additional passage through the engine compartment is made possible due to the two open covering elements 12, 42, which provides flow conditions that are favorable for heat dissipation.

In addition, the second covering element 42 may be situated alone, i.e., without the presence of the first covering element 12 shown in FIG. 1 and FIG. 2, in the underbody area of the truck at the rear wall 40 of the driver's cab 38. In this case, the assistance in meeting the acoustic, aerodynamic, and thermodynamic requirements during operation of the truck is achieved solely by the appropriate displacement of the second covering element 42.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A covering for a motor vehicle, comprising:
at least one covering element, wherein the at least one covering element includes a plurality of slat elements that are translationally movable in a direction of a longitudinal axis of the motor vehicle from a covering position into at least one further position, wherein the at least one covering element is mounted on a stationary covering part, and wherein the at least one covering element is a roller shutter that is woundable about a roller axis,
wherein the covering is mounted to an underside of the motor vehicle and covers at least parts of an engine and a transmission,
wherein a clear opening in relation to a direction of a vertical axis of the motor vehicle is exposed when the at least one covering element is translationally moved into the at least one further position of the at least one covering element, and
wherein the at least one covering element and the stationary covering part are situated beneath the engine and the transmission in the direction of the vertical axis of the motor vehicle.

2. The covering of claim 1, wherein the at least one covering element is displaceable as a function of operating parameters detected by a sensor system.

3. The covering of claim 1, wherein a material of the at least one covering element is acoustically absorbent.

4. A covering for a driver's cab of a truck, the covering comprising:
at least one covering element that is mounted within a rear wall of the driver's cab, wherein the driver's cab is disposed over an engine of the truck and wherein the at least one covering element is translationally movable within the rear wall of the driver's cab in a vertical plane from a covering position into at least one further position, wherein the covering covers at least parts of a rear of the engine of the truck in an area of the rear wall of the driver's cab, wherein the at least one covering element includes individual slat elements, and wherein the at least one covering element is a roller shutter that is woundable onto a roller shutter axis.

5. The covering of claim 4, wherein the at least one covering element is displaceable as a function of operating parameters detected by a sensor system.

6. The covering of claim 4, wherein a material of the at least one covering element is acoustically absorbent.

* * * * *